C. P. SCHULTZ.
TOOTH CLEANING DEVICE.
APPLICATION FILED FEB. 28, 1908.
899,626.
Patented Sept. 29, 1908.
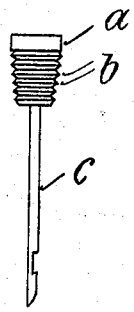
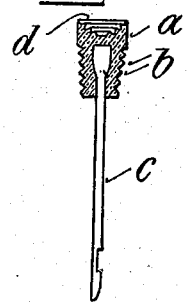

UNITED STATES PATENT OFFICE.

CHARLES PAUL SCHULTZ, OF MUNICH, GERMANY.

TOOTH-CLEANING DEVICE.

No. 899,626.           Specification of Letters Patent.           Patented Sept. 29, 1908.

Application filed February 28, 1908. Serial No. 418,252.

*To all whom it may concern:*

Be it known that I, CHARLES PAUL SCHULTZ, of No. 7 Lindwurmstrasse, of the city of Munich, in Bavaria, Germany, have invented certain new and useful Improvements in and Relating to Tooth-Cleaning Devices, of which the following is a specification.

The device according to the present invention is intended for cleaning teeth with powdered substances.

The essentially new feature of the invention is a means for providing the powder with a better hold, so that it cannot fall off during the process of cleaning, which falling off could only be partly avoided by the cleaners heretofore in use.

Reference being had to the accompanying drawing, Figure 1 is a view of the cleaning-device and Fig. 2 a longitudinal section.

The new form of cleaner is characterized by the cleaner-head —a— of soft rubber being provided with grooves —b— running round its circumference, and not in the direction of its axis, as was up to now usual. This new form of the grooves holds the powder much better than the older form, especially when the cleaning of the teeth takes place in a direction up and down. And further, a spirting or spluttering of the powder during rotation is to a great extent avoided. It will, however, be obvious that the old form of axial grooves can at the same time be combined with this new form of circular grooves. The cleaner-head —a— may advantageously be given a conical form, as shown in the drawing, but may, if desired, also be of any other suitable shape.

The metal shaft or spindle —c— will advantageously be vulcanized into the head —a— in such a way that the end of said shaft is well covered in the interior of the head, so that it cannot come into contact with the teeth when using the front cleaning-surface —d—. With the help of the shaft —c— this cleaning-device is attached to the dental machine and rotated thereby.

The front concave or flat cleaning surface —d— may be smooth, or, as shown in Fig. 2, provided with grooves, in which case these grooves will be circularly arranged, conformably to the peripheral grooves —b—.

What I claim as my invention and desire to secure by Letters Patent, is:

1. In a tooth-cleaning device, the combination of a round body (a) of soft rubber, provided with grooves (b) running round its circumference, and a shaft (c) for suitably connecting said body (a) to a machine, substantially as herein described.

2. In a tooth-cleaning device, the combination of a round body (a) of soft rubber, provided with grooves (b) running round its circumference, a front-surface (d) provided with circular grooves, and a shaft (c) for suitably connecting said body (a) to a machine, substantially as herein described.

In testimony whereof I have signed my name to this specification in the presence of two subscribing witnesses.

CHARLES PAUL SCHULTZ.

Witnesses:
     LOUIS MUELLER,
     MATHILDE K. HELD.